United States Patent
Ito (10) Patent No.: US 7,431,117 B2
(45) Date of Patent: Oct. 7, 2008

(54) STEERING CONTROL APPARATUS (75) Inventor: Akira Ito, Kariya (JP)

(73) Assignee: JTEKT Corporation, Osaka-shi (JP)

( * ) Notice: Subject to any disclaimer, the term of this patent is extended or adjusted under 35 U.S.C. 154(b) by 470 days.

(21) Appl. No.: 11/255,009

(22) Filed: Oct. 21, 2005

(65) Prior Publication Data

US 2006/0090952 A1 May 4, 2006

(30) Foreign Application Priority Data

Oct. 28, 2004 (JP) .............................. 2004-313325

(51) Int. Cl.
- B60S 9/00 (2006.01)
- B62D 5/04 (2006.01)
- B62D 6/00 (2006.01)
- G05D 1/02 (2006.01)
- G06F 7/52 (2006.01)

(52) U.S. Cl. ...................... 180/204; 180/443; 180/446; 701/36; 701/41; 701/42

(58) Field of Classification Search ................ 180/204, 180/419, 443, 446; 701/36, 41, 42, 43, 44
See application file for complete search history.

(56) References Cited

U.S. PATENT DOCUMENTS

| | | | | |
|---|---|---|---|---|
| 5,931,253 A | * | 8/1999 | Shimizu et al. | 180/204 |
| 6,907,333 B2 | * | 6/2005 | Iwazaki | 701/41 |
| 6,983,816 B2 | * | 1/2006 | Takahashi et al. | 180/402 |
| 7,075,456 B2 | * | 7/2006 | Tanaka et al. | 340/932.2 |
| 7,085,634 B2 | * | 8/2006 | Endo et al. | 701/36 |
| 7,127,339 B2 | * | 10/2006 | Iwazaki et al. | 701/36 |
| 2006/0089770 A1 | * | 4/2006 | Ito | 701/41 |

FOREIGN PATENT DOCUMENTS

| | | |
|---|---|---|
| DE | 196 35 892 A 1 | 3/1997 |
| EP | 0 779 181 A2 | 6/1997 |
| JP | 2003-75109 | 3/2003 |
| JP | 2003118599 A * | 4/2003 |
| JP | 2004-37312 | 2/2004 |
| JP | 2004-42769 | 2/2004 |

* cited by examiner

*Primary Examiner*—Lesley D. Morris
*Assistant Examiner*—Daniel Yeagley
(74) *Attorney, Agent, or Firm*—Oblon, Spivak, McClelland, Maier & Neustadt, P.C.

(57) ABSTRACT

A steering control apparatus for an automotive vehicle is provided with s steering control system 41 that comprises a detected steering angle calculating section for calculating a detected steering angle θj based on a variation of a motor rotational angle detected by a motor rotational angle sensor 25. An electric motor 19 is connected to a steering wheel 33 through a reduction mechanism. As the motor rotational angle sensor 25 is provided on the the electric motor 19, resolution of the detected steering angle θj calculated based on the variation of the motor rotational angle becomes higher than that in the prior art, and thereby it becomes possible that the steered wheels are steered under the stable positioning control. Further, as the motor rotational angle sensor 25 is originally provided on the electric motor 19, the size and cost of the apparatus is restrained from being large and high.

4 Claims, 10 Drawing Sheets

STEERING CONTROL APPARATUS

INCORPORATED BY REFERENCE

This application is based on and claims priority under 35 U.S.C. sctn. 119 with respect to Japanese Application No. 2004-313325 filed on Oct. 28, 2004, the entire content of which is incorporated herein by reference.

BACKGROUND OF THE INVENTION

1. Field of the Invention

The present invention relates to a steering control apparatus for an automotive vehicle capable of steering the vehicle automatically without driver's manual operation of a steering wheel.

2. Discussion of the Related Art

There has been developed and placed on the market in recent years an automotive vehicle wherein a steering control apparatus is changeable between steering the vehicle in a manual steering mode and in an automatic steering mode. In the automatic steering mode, for example, in an automatic garaging mode, the vehicle can be conveniently steered automatically to be parked in a garage. In the concrete, the vehicle is stopped at a starting position close to the garage, and the automatic steering mode is activated, wherein a target position in the garage and a path along which the vehicle runs from the starting position to the target position are estimated, and a steered angle of steered wheels (e.g., front wheels of the vehicle) at each position along the path is calculated. Thereafter, when a driver operates an accelerator and a brake pedal, the vehicle runs with the steered wheels being automatically steered so that deviation of the steered angle of the steered wheels detected by a sensor at each position of the path from the calculated steered angle becomes zero, and thereby even an unskilled driver can easily park the vehicle in the garage as described in Japanese unexamined, published patent application No. 2004-42769.

By the way, the steering control apparatus generally substitutes a rotational angle of a steering wheel for the detected steering angle of the steered wheels in executing a positioning control of the steering angle of the steered wheels. And, the steering control apparatus in the prior art receives the rotational angle of the steering wheel, that is, the detected steering angle, from a steering wheel rotational angle sensor, and calculates an electric current command value for driving an electric motor so as to coincide the detected steering angle with the target steering angle of the steered wheels that is estimated according to the target position to which the vehicle is to run. The electric motor is connected between the steering wheel and the steered wheels through a reduction mechanism.

However, the resolution of the steering wheel rotational angle sensor is too low for the prior automatic steering apparatus to execute the stable positioning control. That is, even though the rotational angle of the steering wheel actually changes continuously, the steering control apparatus receives signals indicating the rotational angle of the steering wheel, which changes intermittently because the resolution of the steering wheel rotational angle sensor is low. It causes the output of the steering control apparatus to oscillate or causes large response delay thereof, and thereby it occasionally becomes difficult for the steering control apparatus to stably control the steering angle of the steered wheels under the positioning control. Simply using a steering wheel rotational angle sensor with high resolution to solve such problem causes another problem that the size of the steering control apparatus becomes large and the cost for it rises.

SUMMARY OF THE INVENTION

Accordingly, it is a primary object of the present invention to provide an improved steering control apparatus capable of controlling the steering angle of the steered wheels stably with restraining the size thereof from being large and the cost for it from rising.

Briefly, according to the present invention, there is provided a steering control apparatus which is capable of running an automotive vehicle under an automatic steering control without driver's manual operation of a steering wheel. A steering angle of steered wheels is controlled by an electric motor that is connected to the steering wheel through a reduction mechanism and connected to the steered wheels through another reduction mechanism. The steering apparatus is provided with a steering control system that calculates an electric current command value for the electric motor based on a deviation of a detected steering angle of the steered wheels from a target steering angle calculated according to a predetermined target position to which the vehicle is to run. The steering control system comprises a detected steering angle calculating section which reads out a steering wheel rotational angle from a steering wheel rotational angle sensor provided on the rotational axis of the steering wheel and an motor rotational angle from a motor rotational angle sensor, and stores the steering wheel rotational angle at the beginning of the vehicle running under the automatic steering control as an initial value $\theta c1$ of the detected steering angle. The steering control system calculates a variation $\theta f$ of the motor rotational angle $\theta 7$ from the motor rotational angle at the beginning of the vehicle running under the automatic steering control, and calculates the detected steering angle $\theta j$ by an equation of $\theta j = \theta c1 + \theta f/R$, wherein the initial value $\theta c1$ is added to a value obtained by dividing the variation $Of$ by a reduction ratio R of the reduction mechanism.

With this construction, the detected steering angle calculating section determines the initial value $\theta c1$ of the detected steering angle $\theta j$ with using the steering wheel rotational angle detected by the steering wheel rotational angle sensor, and makes the value $(=\theta f/R)$ obtained by dividing the variation $\theta f$ of the motor rotational angle detected by the motor rotational angle sensor by the reduction ratio R to be the variation of the detected steering angle $\theta j$ from the initial value $\theta c1$. As the electric motor is connected to the steering wheel through the reduction mechanism, the resolution of the detected steering angle $\theta j$ calculated based on the variation of the motor rotational angle detected by the motor rotational angle sensor becomes higher than that in the prior art, and thereby it becomes possible to control the steering angle of the steered wheels under the stable positioning control. Further, as the motor rotational angle sensor that is originally provided on the electric motor is utilized, the size and cost of the apparatus is restrained from being large and high.

BRIEF DESCRIPTION OF THE ACCOMPANYING DRAWINGS

The foregoing and other objects and many of the attendant advantages of the present invention may readily be appreciated as the same becomes better understood by reference to the preferred embodiments of the present invention when considered in connection with the accompanying drawings, wherein like reference numerals designate the same or corresponding parts throughout several views, and in which.

DETAILED DESCRIPTION OF THE PREFERRED EMBODIMENT

Figure 1:
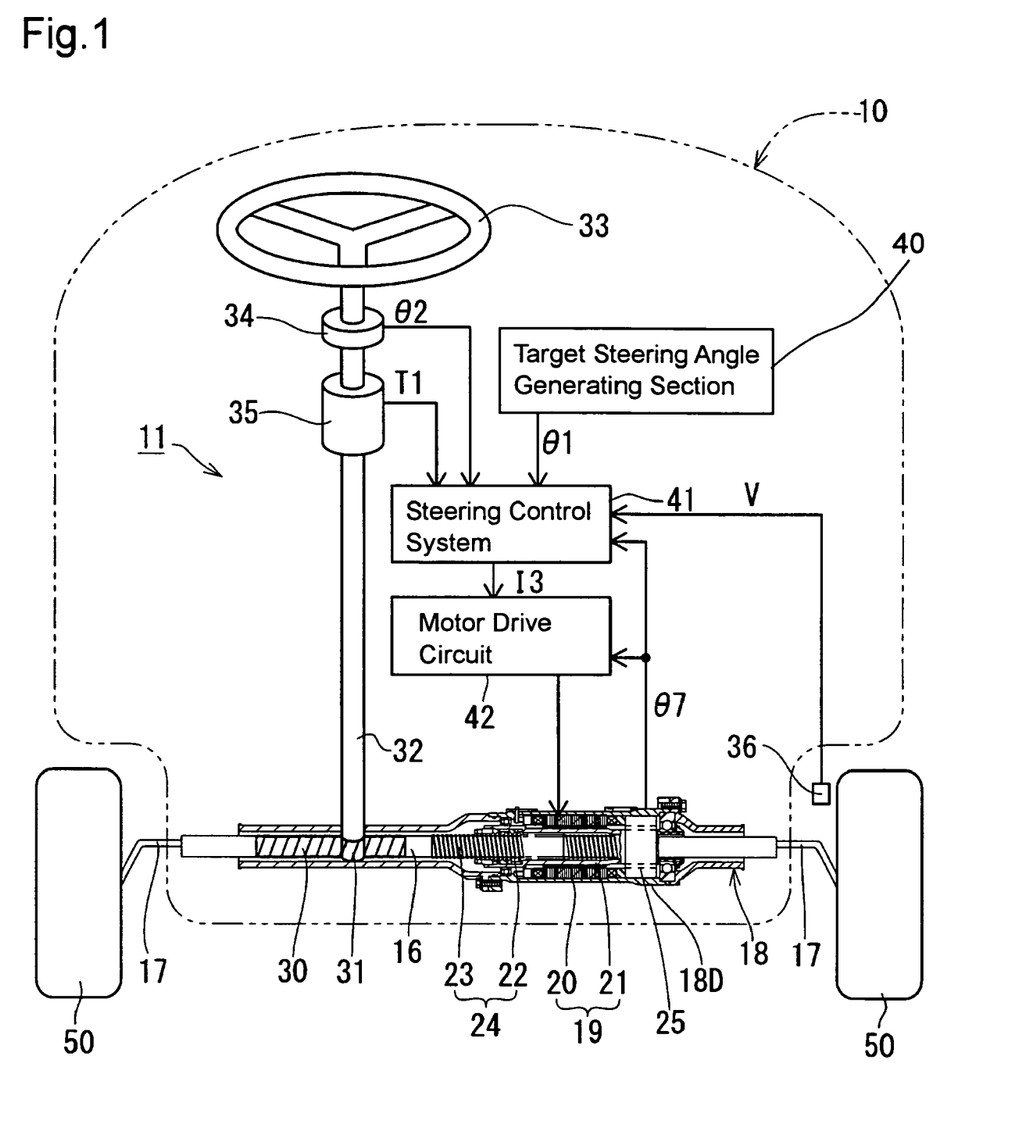
FIG. 1 is a schematic view showing the general structure of the vehicle with the steering control apparatus in the first embodiment according to the present invention.

Hereafter, a steering control apparatus 11 in the first embodiment according to the present invention will be described with reference to FIGS. 1 to 8. An automotive vehicle 10 shown in FIG. 1 is provided with a so-called electric power steering control apparatus 11 for controlling the assist force which an electric motor 19 (e.g., brushless electric motor) generates in dependence upon the torque exerted on the steering wheel 33 by a driver. The assist force is applied to steered wheels 50, 50 (e.g., front wheels of the vehicle). In the concrete, a rack shaft 16 extends through a cylindrical housing 18 between the steered wheels 50, 50 and opposite ends of the rack shaft 16 are connected to the steered wheels 50, 50 via tie rod 17, 17 outside the housing 18. The housing 18 is mounted on a body of the vehicle 10. There is provided with a large-diameter portion 18D on the axially middle portion of the housing 18, wherein the electric motor 19 is accommodated. The electric motor is composed of a stator 20 that is fixedly fitted in the interior of the large-diameter portion 18D, and a cylindrical rotor 21 that is rotatably provided in an inner bore of the stator 20. The rack shaft 16 extends through the stator 20. A motor rotational angle sensor 25 (e.g., resolver) for detecting a rotational angle of the rotor of the electric motor 19 is provided at an end portion of the large-diameter portion 18D of the housing 18.

A ball nut 22 is fixedly fitted in the inner bore of the rotor 21, and a screw portion 23 is formed on the axially middle portion of the rack shaft 16. A ball screw mechanism 24 is composed of the ball nut 22 and the screw portion 23. When the ball nut 22 is rotated by the rotor 21, the ball screw portion 23 is linearly moved relative to the housing 18, and thereby the steered wheels 50, 50 are steered.

Formed on one end portion of the rack shaft 16 is a rack 30 that is meshing engagement with a pinion 31 provided at the lower end portion of the steering shaft 32 (which corresponds to a rotational axis of a steering wheel as recited in the claimed invention). The steering wheel 33 is attached to the upper end of the steering shaft 32.

In this embodiment, the ball screw mechanism 24 corresponds to a reduction mechanism that is connected between the steered wheels 50 and the electric motor 19 as recited in the claimed invention. And, the rack 30, the pinion 31 and the ball screw mechanism 24 correspond to a reduction mechanism that is connected between the electric motor 19 and the steering wheel 33 as recited in the claimed invention.

A steering wheel rotational angle sensor 34 is provided on the upper end portion of the steering shaft 32. The steering wheel rotational angle sensor 34 detects a steering wheel rotational angle $\theta 2$ as recited in the claimed invention (i.e., a rotational angle of the steering wheel 33).

A torque sensor 35 is provided on the steering shaft 32 at the position lower than the steering wheel rotational angle sensor 34. The torque sensor 35 is composed of a torsion bar (not shown) that is twisted according to the loaded torque T1 applied to the steering shaft 32, and a pair of resolvers (not shown) for detecting the differential angle between the respective ends of the torsion bar. The torque sensor 35 detects the loaded torque T1 applied to the steering shaft 32 based on the differential angle between the rotational angles of the respective ends of the torsion bar, which are detected by the resolvers. And, a vehicle speed sensor 36 for detecting a vehicle speed based on a rotational speed of the steered wheel 50 is provided near the steered wheel 50.

An automatic steering control system (not shown) is provided in the steering control apparatus 11 mounted on the vehicle 10 in the embodiment according to the present invention. The automatic steering control system starts to work when the automatic steering mode is selected by a mode selector switch (not shown) on an operation panel, whereby the vehicle 10 is changed from a manual steering mode (i.e., the mode wherein the steered wheels 50 are steered by driver's manual operation of the steering wheel) to the automatic steering mode (i.e., the mode wherein the steered wheels 50 are automatically steered without driver's manual operation of the steering wheel 33). Hereinafter, description will be made with reference to FIG. 2 as to the operation in the automatic steering mode, wherein the vehicle 10 is parked in a garage E1 without driver's manual operation of the steering wheel 33 for instance. First, the vehicle 10 is stopped at a temporary stop position P2 in front of the entrance of the garage E1. Then, the selector switch is switched over to select the automatic steering mode. Thereby, the image of the inside of the garage E1 that is taken by a camera (not showin) is displayed on an inside monitor (not shown) that is provided in the vehicle. A vehicle-shaped cursor (shown in FIG. 2 by reference letters CS) is shown on the inside monitor. The driver moves the vehicle-shaped cursor with, for example, a cursor key to a proper position in the garage displayed on the inside monitor so as to set a target position P1 recited in the claimed invention in the garage E1.

Figure 2:
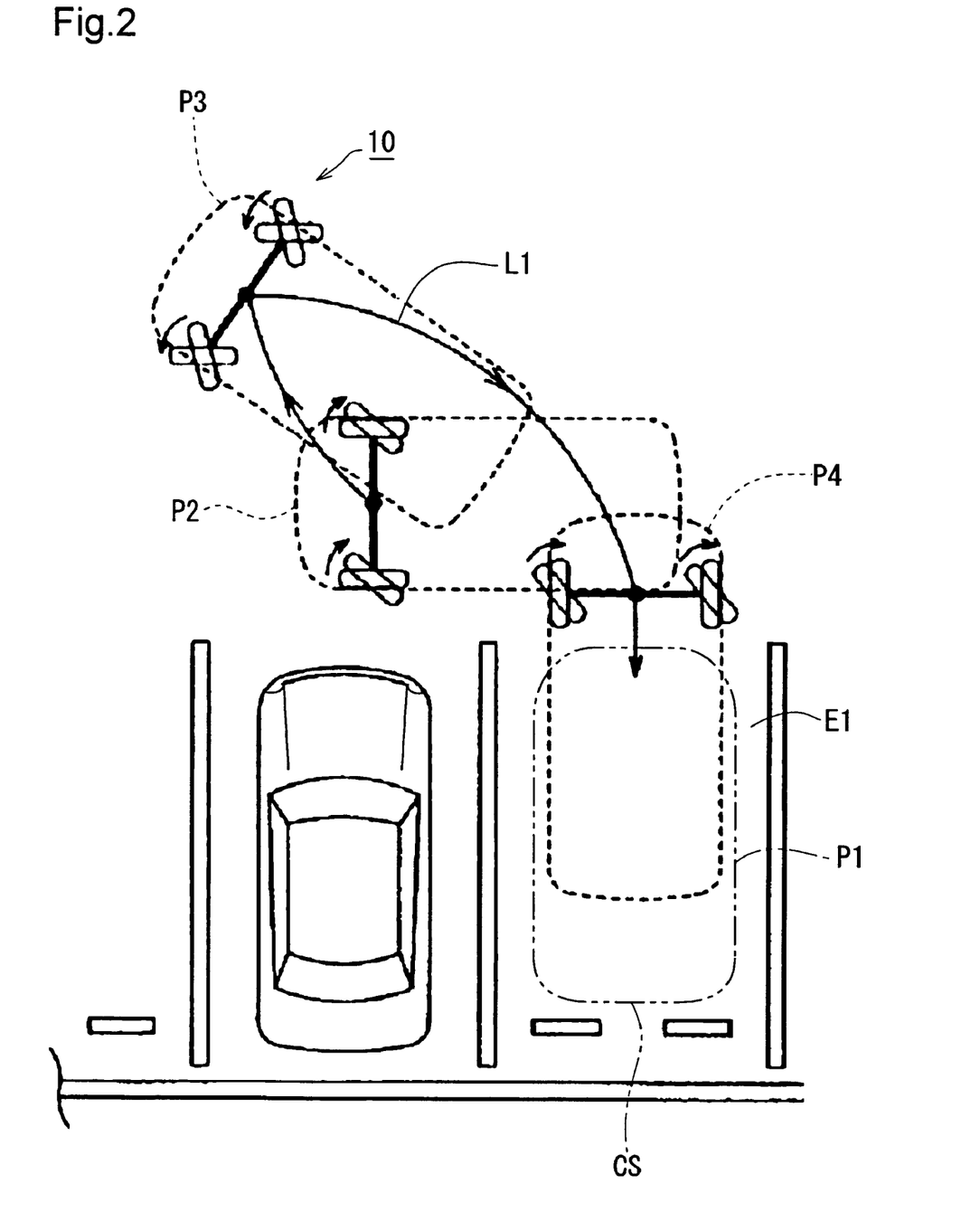
FIG. 2 is a drawing illustrating the operation of the apparatus where the vehicle is parked in a garage under the automatic steering control.

Then, a target steering angle generating section 40 that is provided in the automatic steering control system calculates a target running path L1 from the temporary stop position to the target position P1, and determines intermediate positions P2, P3, P4, etc. on the path L1 where steering operation are to be performed. And, the target steering angle generating section 40 calculates target steering angles $\theta 1$ and outputs them. A steering control system 41 as recited in the claimed invention calculates an electric current command value I3 for the electric motor 19 at respective positions P2, P3, P4 based on the target steering angles $\theta 1$ at respective positions P2, P3, P4. Thereafter, when the driver operates an accelerator and a brake pedal according to instructions given vocally from a loudspeaker, the electric current corresponding to the electric current command value I3 is applied from the motor drive circuit 42 to the electric motor 23. The steered wheels 50 are steered so that the detected steering angle $\theta j$ thereof coincides with the target steering angle $\theta 1$. Accordingly, even an unskilled driver can run the vehicle along the target running path L1 calculated by the target steering angle generating section 40 with just operating the accelerator and the brake pedal, thereby to park the vehicle in the garage easily.

When the automatic steering mode is cancelled, the manual steering mode is activated, wherein the driver has to manually operate the steering wheel 33. In the manual steering mode, the electric motor 19 generates an assist force (or assist torque) for assisting driver's steering operation.

With using such art, it is possible that manual steering operation for steering a bus that runs along a predetermined route can be partially replaced with the automatic steering control.

Figure 3:
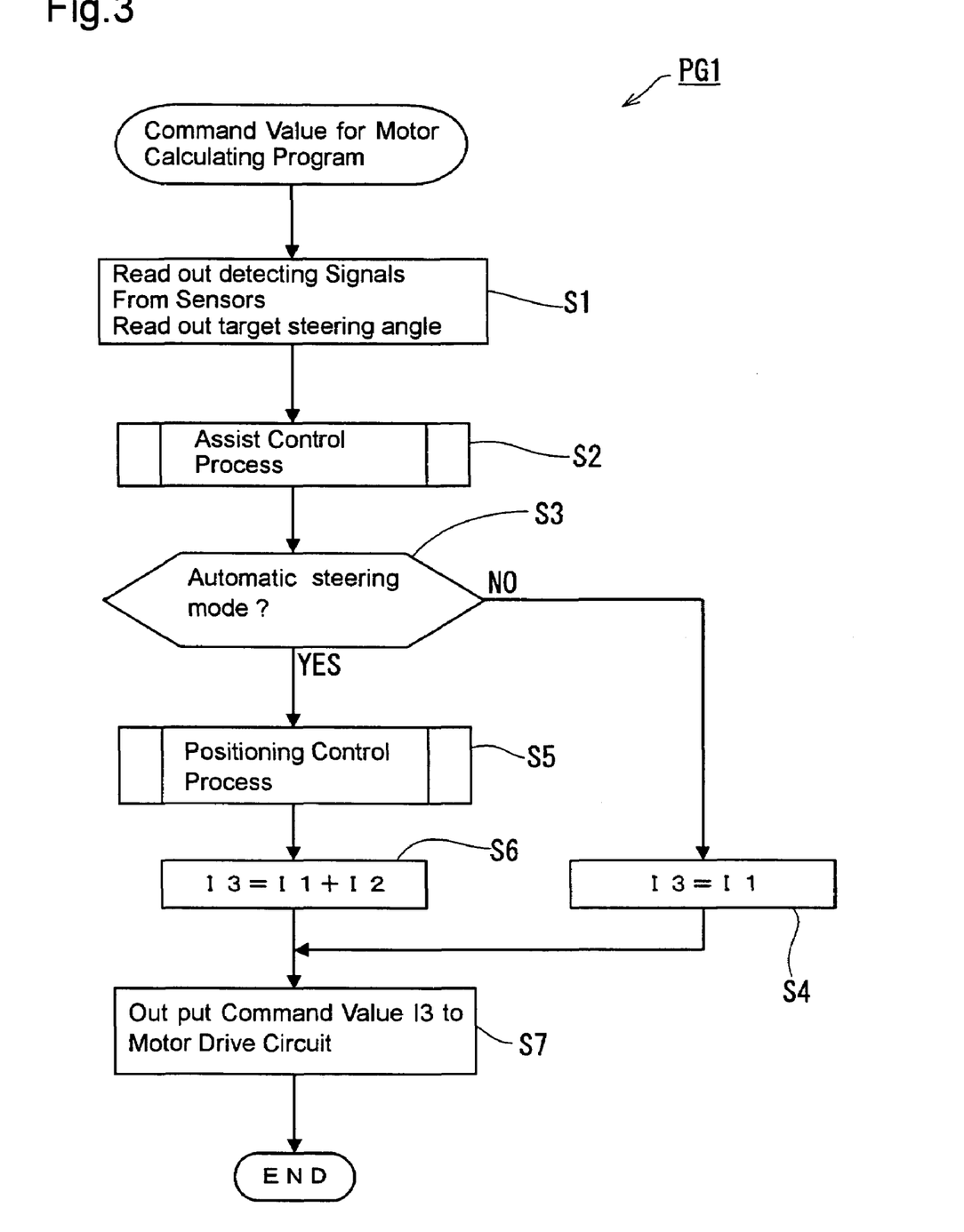
FIG. 3 is a flow chart of the program for calculating the electric current command value for the electric motor.
Figure 9:
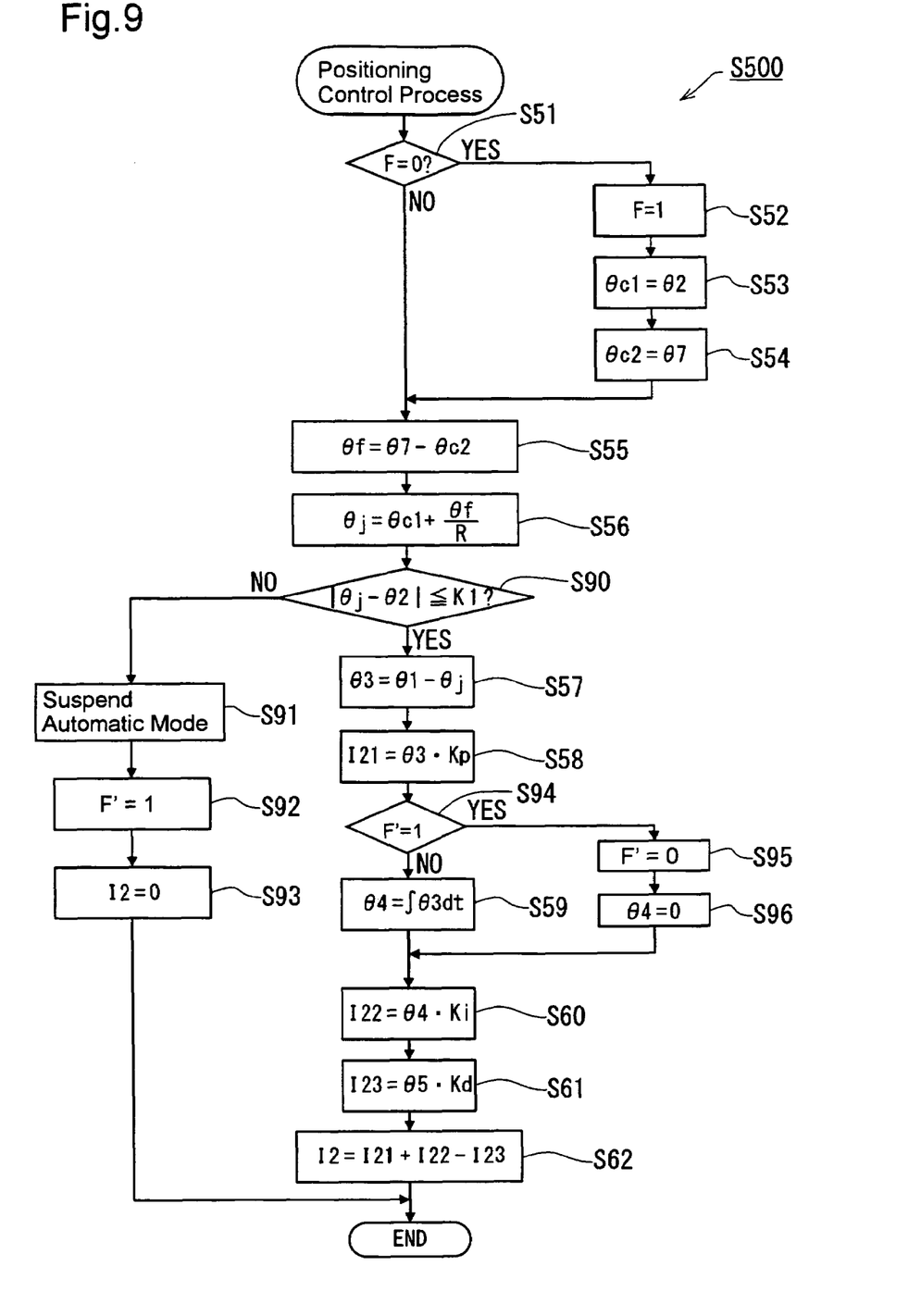
FIG. 9 is a flow chart for executing the positioning control process in the second embodiment.

The steering control system 41 is provided with a memory (not shown), wherein an electric current command value calculating program PG1, shown in FIG. 3, for calculating an electric current command value for the electric motor is stored and an automatic steering mode start flag F (see FIG. 9) is allocated. The automatic steering mode start flag F is initialized to be "0" because the steering control apparatus 11 is initialized to be in the manual steering mode just after an ignition key of the vehicle is turned on. And, when the steering control system 41 is changed from the manual steering mode to the automatic steering mode by operating the selector switch, the automatic steering flag F is set to "0". As shown in FIG. 9, an automatic steering mode suspended flag F' for determining whether the automatic steering mode is suspended is also allocated in the memory. The automatic steering mode suspended flag F' is initialized to be "0" just after an ignition key of the vehicle is turned on. If the difference |θj−θ2| (which will be explained later) is more than the predetermined allowable error K1 (i.e., the answer at step S90 is "No"), the control system 41 suspends the automatic steering mode (step S91), and sets the automatic steering mode suspended flag to "1" (step S92), and sets the electric current command value I2 for the positioning control to "0", and then causes the program to proceed out of the positioning control process (step S500). Detail explanation will be made later.

The steering control system 41 can execute steering operation in both the manual steering mode and the automatic steering mode by repetitively executing the electric current command value calculating program PG1 at a predetermined time interval. In the concrete, when the calculating program PG1 is executed, the steering control system 41 reads out respective detecting signals (steering wheel rotational angle θ2, loaded torque T1, vehicle speed V and motor rotational angle θ7) detected by the steering wheel rotational angle sensor 34, the torque sensor 35, the vehicle speed sensor 36 and the motor rotational angle sensor 25 as well as the target steering angle θ1 calculated by the target steering angle generating section 40 (step S1).

Then, an assist control process (step S2) is executed so as to calculate an electric current command value I1 for the assist control. A concrete structure of the assist control process (step S2) will be described later.

After executing the assist control process (step S2), the steering control system 41 determines whether the automatic steering mode is active or not (step S3). If the answer is "No" (step S3), wherein the automatic steering mode is not active, that is, the manual steering mode is active, the steering control system 41 outputs the electric current command value I1 for the assist control to a motor drive circuit 42 as an electric current command value I3 for the electric motor (step S4, S7).

If the answer at step S3 is "Yes", wherein the automatic steering mode is active, the steering control system 41 executes the positioning control process (step S5) and calculates an electric current command value I2 for the positioning control and outputs the sum of the electric current command value I2 for the positioning control and the electric current command value I1 for the assist control as an electric current command value I3 for the electric motor to a motor drive circuit 42 (step S6, S7). The concrete structure of the positioning control process (step S5) will be described in detail later.

When the electric current command value I3 for the electric motor is outputted to the motor drive circuit 42 (step S7), the execution of the electric current value calculating program PG1 is terminated. The calculating program PG1 is repeatedly executed at a predetermined time interval. The execution of the calculating program PG1 corresponds to a control system as indicated by a block diagram shown in FIG. 6. An assist control section 41A shown in FIG. 6 corresponds to the assist control process (step S2), a positioning control section 41B corresponds to the positioning control process (step S5), and a changeover section 41D corresponds to the step S3, S4 and S6. The whole structure of the electric current value calculating program PG1 is as described hereinabove.

Figure 4:
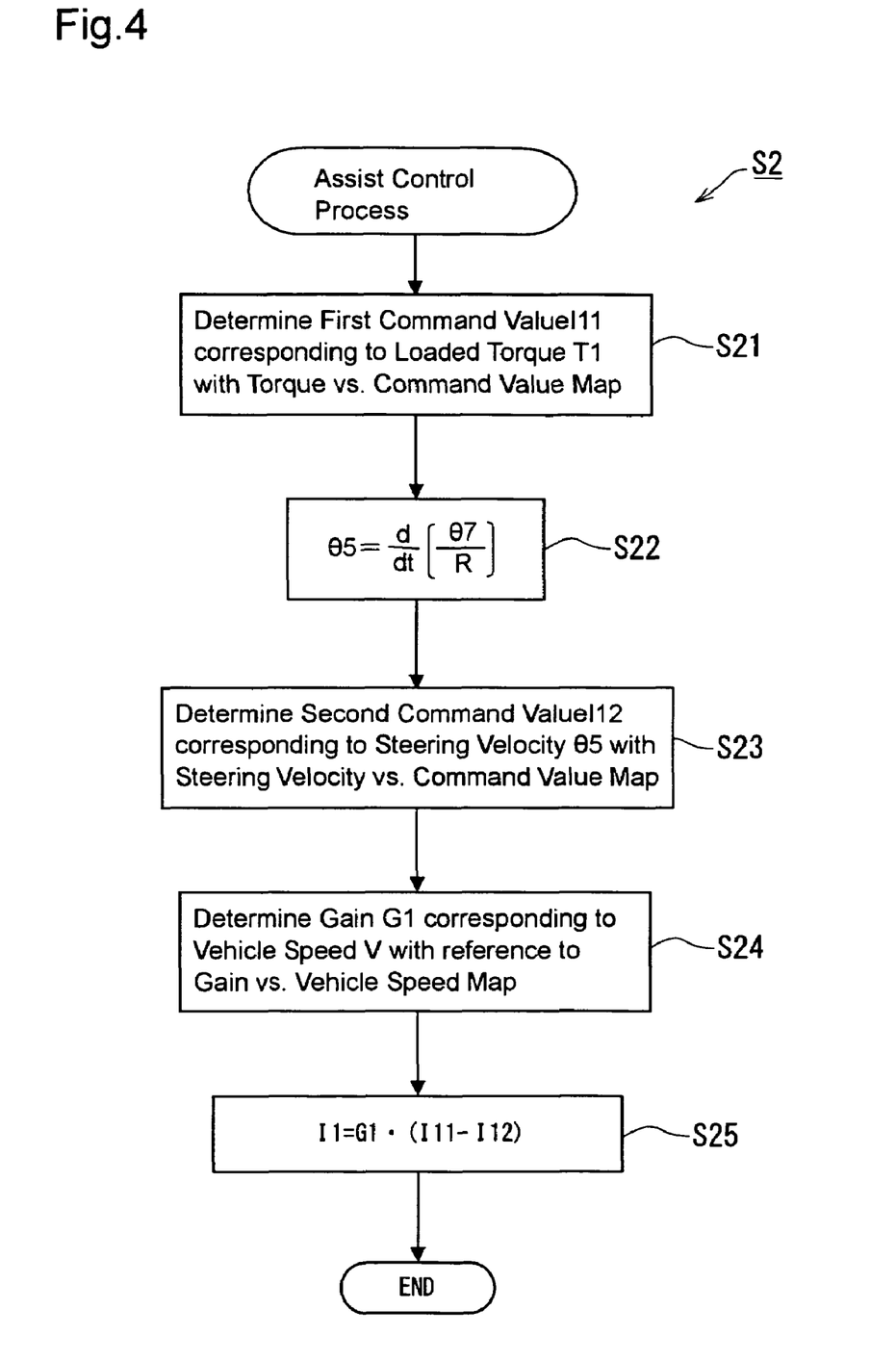
FIG. 4 is a flow chart for executing the assist control process.

Next, the concrete structure of the assist control process (step S2) in the electric current value calculating program PG1 will be explained with reference to FIG. 4. When the assist control process (step S2) is executed, the steering control system 41 determines at step S21 a first electric current command value I11 corresponding to the loaded torque T1 by reference to a loaded torque vs. electric current command value characteristic map (not shown). Then, the control system 41 calculates a steering angular velocity θ5 by differentiating the motor rotational angle θ7 by time (step S22), and determines at step S23 a second electric current command value I12 corresponding to the steering angular velocity E5 by reference to a steering angular velocity θ5 vs. electric current command value characteristic map (not shown). The control system 41 determines a gain G1 corresponding to the vehicle speed V by reference to a vehicle speed vs. gain characteristic map (step S24). The control system 41 calculates the electric current command value I1 (=G1×(I11−I12)) for the assist control by multiplying the difference between the first electric current command value I11 and the second electric current command value I12 by the gain G1 (step S25) and terminates to executes the assist control process (step S2).

The above-mentioned loaded torque vs. electric current command value characteristic map is of configuration wherein, for instance, the first electric current I11 increases as the loaded torque T1 increases. Thereby, the increment of the loaded torque T1 can be decreased by the assist torque generated by the electric motor 19 corresponding to the first electric current command value I11, so that the driver can operate the steering wheel with feeling a stable steering reaction force applied thereto regardless of a coefficient of friction of a road surface.

The steering angular velocity vs. electric current command vale map is of configuration wherein the second electric current command value I12 increases as the steering angular velocity θ5 increases. As the second electric current command value I12 is subtracted from the first electric current command value, a steering resistance i.e., a resistance to the rotation of the steering wheel becomes large when the steering wheel 33 is rotated rapidly, and thereby the damping is afforded.

A vehicle speed vs. gain map is of configuration wherein the gain G1 decreases as the vehicle speed V increases. Accordingly, the assist torque generated by the electric motor 19 is decreased as the vehicle speed V increases, and thereby rotating the steering wheel 33 at a high angular velocity at a high vehicle speed is restrained, and the driver can operate the steering wheel 33 with ease at a high angular velocity at a low vehicle speed.

Figure 6:
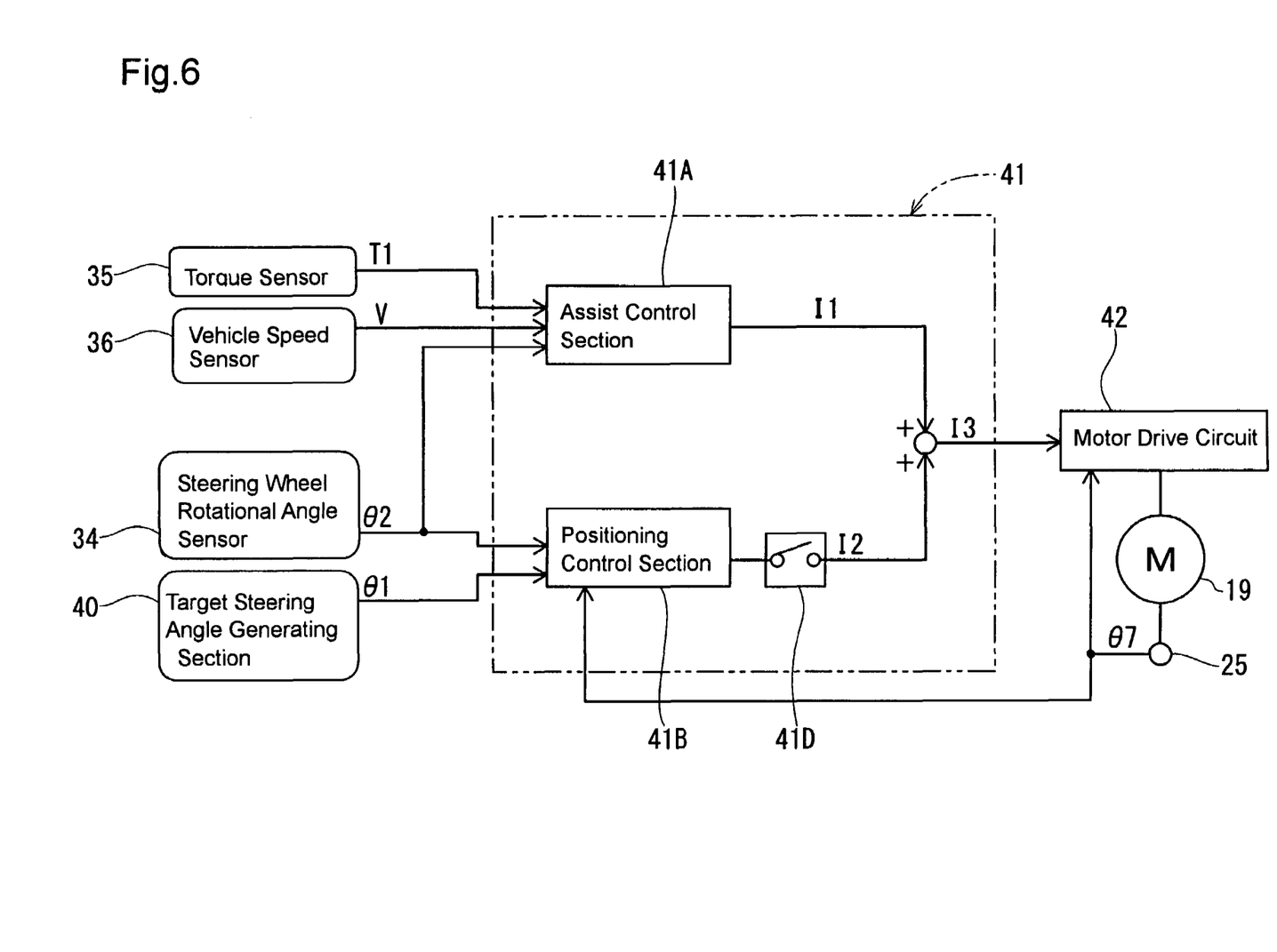
FIG. 6 is a block diagram showing the structure of the steering control apparatus.
Figure 7:
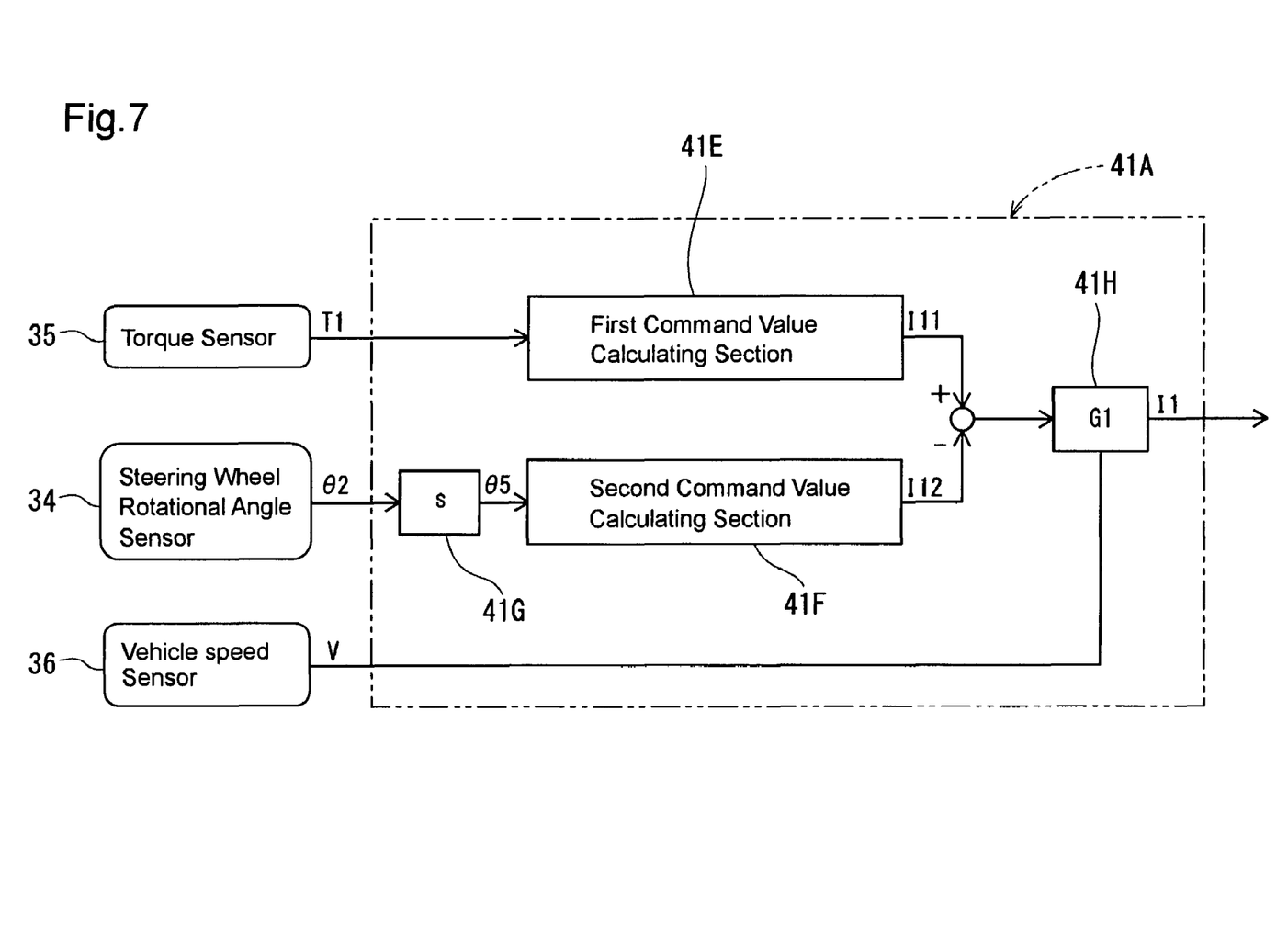
FIG. 7 is a block diagram showing the structure of the assist control section.

The execution of the assist control process (step S2) corresponds to the assist control section 41A as indicated by a block diagram shown in FIG. 6. A first electric current command value calculating section 41E corresponds to the step S21, a second electric current command value calculating section 41F corresponds to the step S23, and a gain multiplying section 41H corresponds to the step S24 and S25. The whole structure of the assist control process (step S2) is as described hereinabove.

Figure 5:
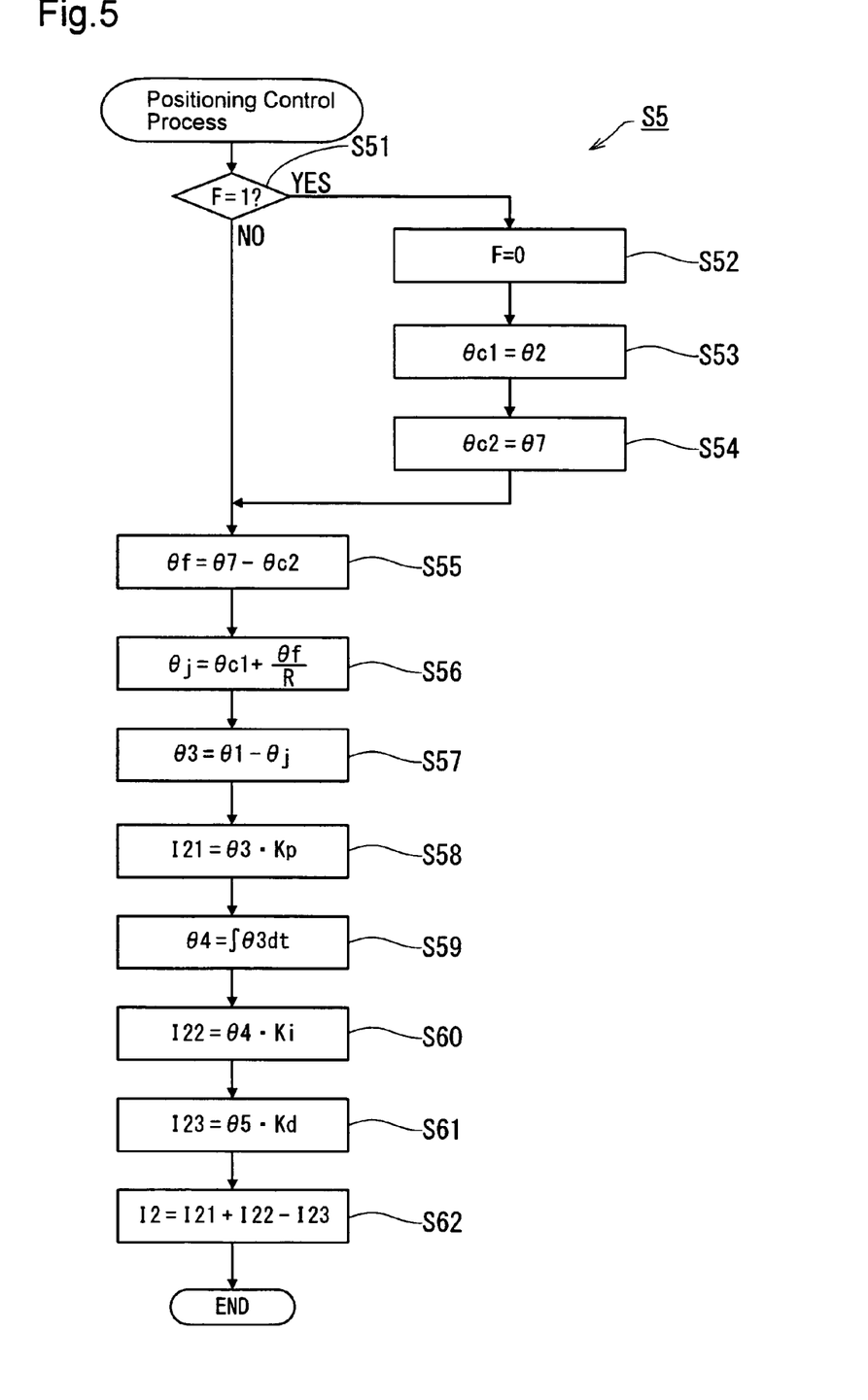
FIG. 5 is a flow chart for executing the positioning control process.

Next, the concrete structure of the positioning control process (step S5) in the electric current value calculating program PG1 will be explained with reference to FIG. 5. When the positioning control process (step S5) is executed, the steering control system 41 determines whether the automatic steering control start flag F is "1" or not (step S51). If the start flag F is "1" (i.e., the answer at step S51 is "Yes"), the control system 41 perceives that the vehicle is running under the automatic steering control in the automatic steering control mode starts, and then sets the automatic steering control start flag F to "0" (step S52). In turn, the control system 41 reads out to store the steering wheel rotational angle θ2 detected by the steering wheel rotational angle sensor 34 at the beginning of the vehicle running under the automatic steering control as an initial value θc1 of the detected steering angle (step S53). The control system 41 reads out to store the motor rotational angle θ7 detected by the motor rotational angle sensor 25 at the beginning of the vehicle running under the automatic steering control as an initial value θc2 of the motor rotational angle (step S54), and then causes the program to proceed to step S55.

If the flag F is not "1" (i.e., the answer at step 51 is "No"), the control system 41 perceives that the vehicle is running under the automatic steering control is continuing, and causes the program to proceed to step 55 without storing the initial values θc1 and θc2. The control system 41 calculates a variation amount θf(=θ7−θc2) of the motor rotational angle θ7, which is the variation amount of the motor rotational angle θ7 from the motor rotational angle θc2 at the beginning of the vehicle running under the automatic steering control. Then, the control system 41 calculates a calculated steered angle θj(=θc1+θf/R), wherein the variation amount θf is divided by a reduction ratio of the reduction mechanism arranged between the steering wheel 33 and the electric motor 19 and the initial value θc1 of the steering wheel rotational angle is added to the quotient. As the motor rotational angle θ7 is equal to the initial value θc1 at the beginning of the vehicle running under the automatic steering control, the variation amount θf becomes 0, and therefore the detected steering angle θj is equal to the initial value θc1 of the steering wheel rotational angle.

After calculating the detected steering angle, the control system 41 calculates the deviation θ3 (=θ1−θj) of the detected steering angle θj from the target steering angle θ1 (step S57), and calculates a third electric current command value I21 by multiplying the deviation 03 by a proportional constant Kp (step S58). In turn, the control system 41 calculates time-integrated value θ4 by integrating the deviation θ3 with respect to time (step S59), and calculates a fourth electric current command value I22 by multiplying the time-integrated value θ4 by a integral constant Ki (step S60). The control system 41 calculates a fifth electric current command value I23 by multiplying the steering angular velocity 05 calculated by the assist control process S2 by a differential constant Kd (step S61), and calculates the electric current command value I2 for the positioning control by subtracting the fifth electric current command value I23 from the sum of the third and fourth electric current command values I21 and I22. Then, the control system 41 terminates to execute the positioning control process (step S5).

Figure 8:
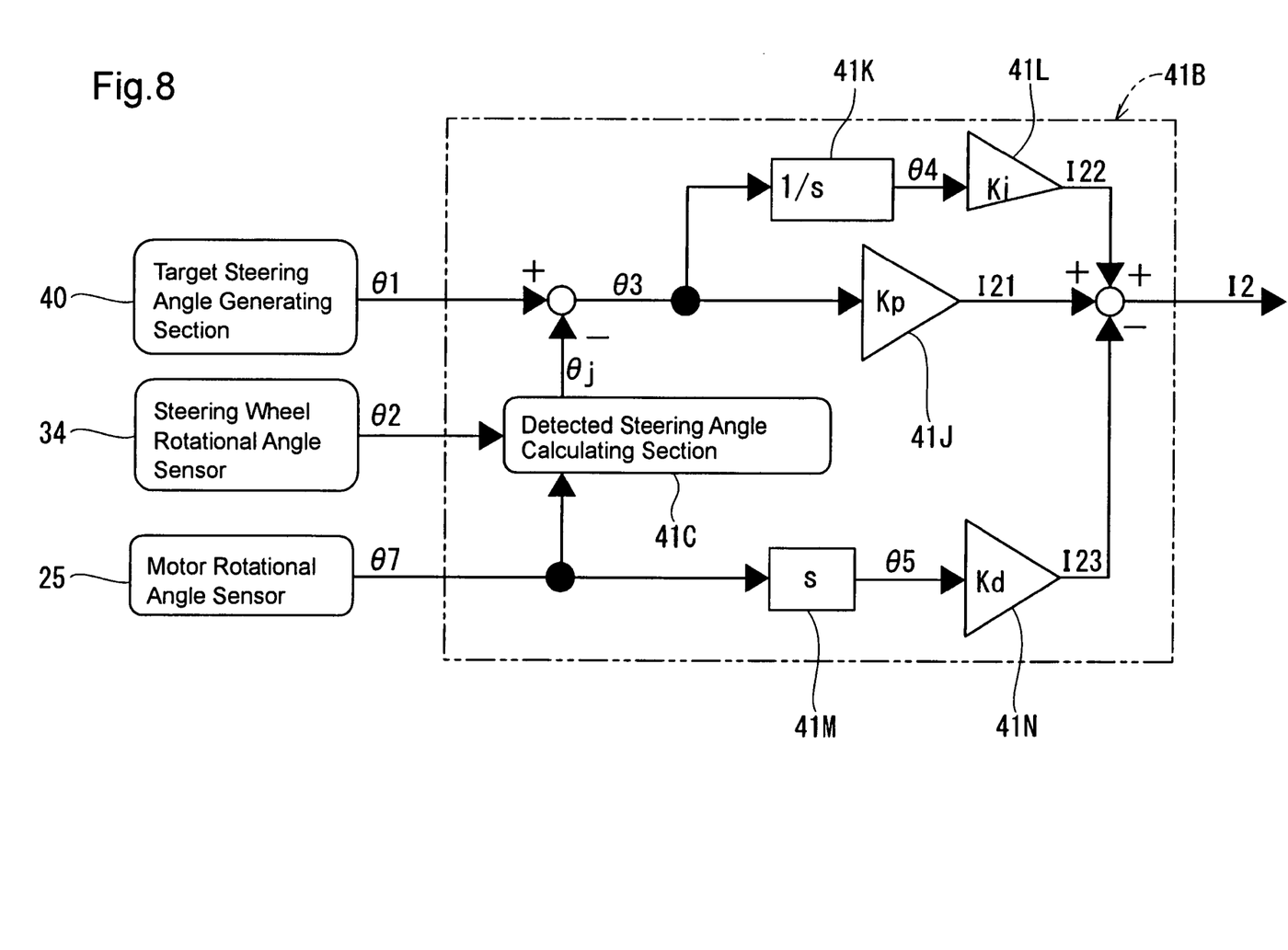
FIG. 8 is a block diagram showing the structure of the positioning control section.

The execution of the positioning control process S5 corresponds to the positioning control section 41B as indicated by a block diagram shown in FIG. 8. A detected steering angle calculating section 41C corresponds to the steps S51~S56, and a proportional constant multiplying section 41J corresponds to the step S58. An integral calculating section 41K corresponds to the step S59, and an integral constant multiplying section 41L corresponds to the step S60, and a differential constant multiplying section 41N corresponds to the step S61. A differential calculating section 41M corresponds to the step S22 in the abovementioned assist control process S2. The whole structure of the positioning control process S5 is as described hereinabove.

Next, the operation of the steering control apparatus 11 as constituted above in the first embodiment will be described hereinafter. When the steering control system 41 of the vehicle 10 is in the manual steering mode, the assist control section 41A of the steering control system 41 shown in FIG. 6 calculates the electric current command value I1 for the assist control based on the loaded torque T1 detected by the torque sensor 35. The electric current command value I1 for the assist control is applied to the motor drive circuit 42 as the motor electric current command value I3 for the electric motor. An electric current corresponding to the electric current command value I1 is applied from the drive circuit 42 to the electric motor 19 to operate the same, and thereby the electric motor 19 generates an assist force (or an assist torque) corresponding to the loaded torque T1 applied to the steering shaft 32. And, as mentioned above, the driver can operate the steering wheel 33 with feeling a stable steering reaction force applied thereto regardless of a coefficient of friction of a road surface. And, turning the steering wheel 33 at a high angular velocity at a high vehicle speed is restrained, and the driver can operate the steering wheel 33 with ease at a high angular velocity at a low vehicle speed so as to enable the driver to run the vehicle safety.

When the driver operates the mode selector switch (not shown) to select the automatic steering mode, and sets the target position P1 to which the vehicle is to run, the sum of the electric current command value I1 calculated by the assist control section 41A of the steering control system 41 shown in FIG. 6 and the electric current command value I2 calculated by the positioning control section 41B is used as the electric current command value I3 for the electric motor 19. As mentioned above, the positioning control section 41B calculates the electric current command value I2 based on the deviation of the detected steering angle θj from the target steering angle θ1. The target steering angle θ1 is determined by the target steering angle generating section 40 according to the predetermined target position P1.

The steering control system 41, or in detail the positioning control section 41B determines the initial value θc1 of the detected steering angel θj with using the steering wheel rotational angle θ2 detected by the steering wheel rotational angle sensor 34, and devides the variation θf of the motor rotational angle detected by the motor rotational angle sensor 25 by the reduction ratio R of the reduction mechanism to obtain the variation of the detected steering angle θj from the initial value θc1. As the electric motor 19 is connected to the steering wheel 33 by way of the reduction mechanism composed of the rack 30, the pinion 31 and the ball screw mechanism 24, and the motor rotational angle sensor 25 is provided on the output shaft thereof, the resolution of the detected steering angle θj that is derived from the output of the motor rotational angle sensor 25 becomes finer than that in the prior art. In the concrete, assuming that the resolution of the steering wheel rotational angle sensor in the prior art and the motor rotational angle sensor 25 in the first embodiment are same, the resolution of the detected steering angle θj becomes as fine as the resolution of the steering wheel rotational angle sensor 25 is divided by the reduction ratio R of the reduction mechanism. As the motor rotational angle sensor 25 is provided on the electric motor 19 such as a brushless motor so as to execute the positioning control on the electric motor 19, its resolution is originally higher than that of the steering wheel rotational angle sensor 34.

As described hereinabove, since the steering control system 41 in the first embodiment, calculates the electric current command value I3 for the electric motor based on the detected steering angle θj that is higher in resolution than that in the prior art, and drive the electric motor 19 according to the electric current command value I3, the steered wheels 50 are steered under the more stable positioning control in the automatic steering mode than in the prior art. Further, in the embodiment, as the resolution of the detected steering angle θj is improved by utilizing the motor rotational angle sensor 25 that is originally provided on the electric motor 19, the size and cost thereof can be restrained in comparison with the case therein a new component is installed. And, according to the abovementioned structure, since the initial value θc1 of the detected steering angle θj is set by the steering wheel rotational angle sensor 34, it is not necessary that the motor rotational angle sensor 25 is an absolute encoder, that is, the motor rotational angle sensor 25 can be a resolver that only detects increment of the rotational angle of the rotor of the electric motor 19, and thereby it becomes possible to decrease the whole size of the electric motor 19 including the motor rotational angle sensor 25.

As the steering control system 41 is arranged in the vehicle 10 that can run under the automatic steering control, and is provided for controlling the electric motor 19, the output signal from the motor rotational angle sensor 25 mounted on the electric motor 19 is inputted to the steering control system 41 without passing through a vehicle LAN. On the contrary, it is usual that the output signal from the steering wheel rotational sensor 34 is inputted to the steering control system through the vehicle LAN. And, in the prior art, the steering control system reads out the output signal from the steering wheel rotational angle sensor on communication frequency of the vehicle LAN. In the first embodiment, since the steering control system 41 reads out the output signal from the motor rotational angle sensor 25 on high frequency that has no relation to the communication frequency of the vehicle LAN, the resolution of the detected steering angle θj becomes substantially high so as to make positioning control on the steered wheels 50 stable.

Second Embodiment

The second embodiment is shown in FIG. 9, wherein only a portion of the positioning control process differs in structure from the first embodiment. That is, the positioning control process (step 500) in the second embodiment is provided with a step S90 that is inserted between the steps S56 and S57, which is provided in the positioning control process in the first embodiment. In the step S90, it is determined whether the difference Δθ(=θj−θ2) between the detected steering angle θj calculated in the steps S51~S56 and the steering wheel rotational angle θ2 detected by the steering wheel rotational angle sensor 34 is less than or equal to a predetermined allowable error K1 or not. If the difference Δθ is more than the predetermined allowable error K1 (i.e., the answer at step S90 is "No"), the control system 41 suspends the automatic steering mode (step S91), and sets the automatic steering mode suspended flag F' to "1" (step S92), and sets the electric current command value I2 for the positioning control to "0", and then causes the program to proceed out of the positioning control process (step S500).

On the other hand, If the difference Δθ is less than or equal to the predetermined allowable error K1 (i.e., the answer at step S90 is "Yes"), the control system 41 determines whether the automatic steering mode suspended flag F' is "1" or not after the execution of the steps S57 and S58 that is explained in the first embodiment. If the automatic steering mode suspended flag F' is "1" (i.e., the answer at step S94 is "Yes"), the control system 41 perceives that the automatic steering mode is resumed after the automatic steering mode is suspended (i.e., after the vehicle running under the automatic steering control is suspended, it resumed). And, the control system 41 sets the automatic steering mode suspended flag F' to "0" (step S95), and initializes the time-integrated value θ4 to "0" (step S96), and then causes the program to proceed to step S60 that is explained in the first embodiment. If the automatic steering mode suspended flag F' is "0" (i.e., the answer at step S94 is "No"), the control system 41 perceives that the automatic steering mode is continuing, and calculates the time-integrated value θ4 (step S59), thereafter to execute the steps following the step S59 with using the time-integrated value θ4.

According to the structure of the second embodiment, since the steering wheel 33 and the electric motor 19 are mechanically connected, the steering wheel rotational angle θ2 detected by the steering wheel rotational angle sensor 34 and the motor rotational angle θ7 detected by the motor rotational angle sensor 25 vary together in normal condition. Therefore, the difference between the detected steering angle θj and the steering wheel rotational angle θ2 is less than or equal to the predetermined allowable error K1 in normal condition. If there is something abnormal in communication through vehicle LAN, or in the steering wheel rotational angle sensor 34 or the motor rotational angle sensor 25, the difference Δθ between the detected steering angle θj and the steering wheel rotational angle θ2 increases over the predetermined allowable error K1. In the present embodiment, when an abnormal condition is detected by determining that the difference Δθ between the detected steering angle θj and the steering wheel rotational angle θ2 is over the predetermined allowable error K1, the vehicle running under the automatic steering control is suspended to secure safety.

If the vehicle running under the automatic steering control is resumed in a state wherein the last time-integrated value θ4 is still stored, the electric current command value I3 for the electric motor at the beginning of the resumption becomes large because of the last time-integrated value θ4, thereby to cause the steered wheels 50 to be steered at an abnormally high angular velocity. The last time-integrated value θ4 was used in the last vehicle running under the automatic steering control that was suspended before the resumption. However, the steering control system 41 resets the last time-integrated value θ4 before the vehicle running under the automatic steering control is resumed, it can be avoided that the steered wheels 50 is steered at the abnormally high angular velocity.

(Modifications)

The present invention is not limited to those in the foregoing embodiments. For example, the modifications as enumerated below are encompassed in the technological scope of the present invention.

Figure 10:
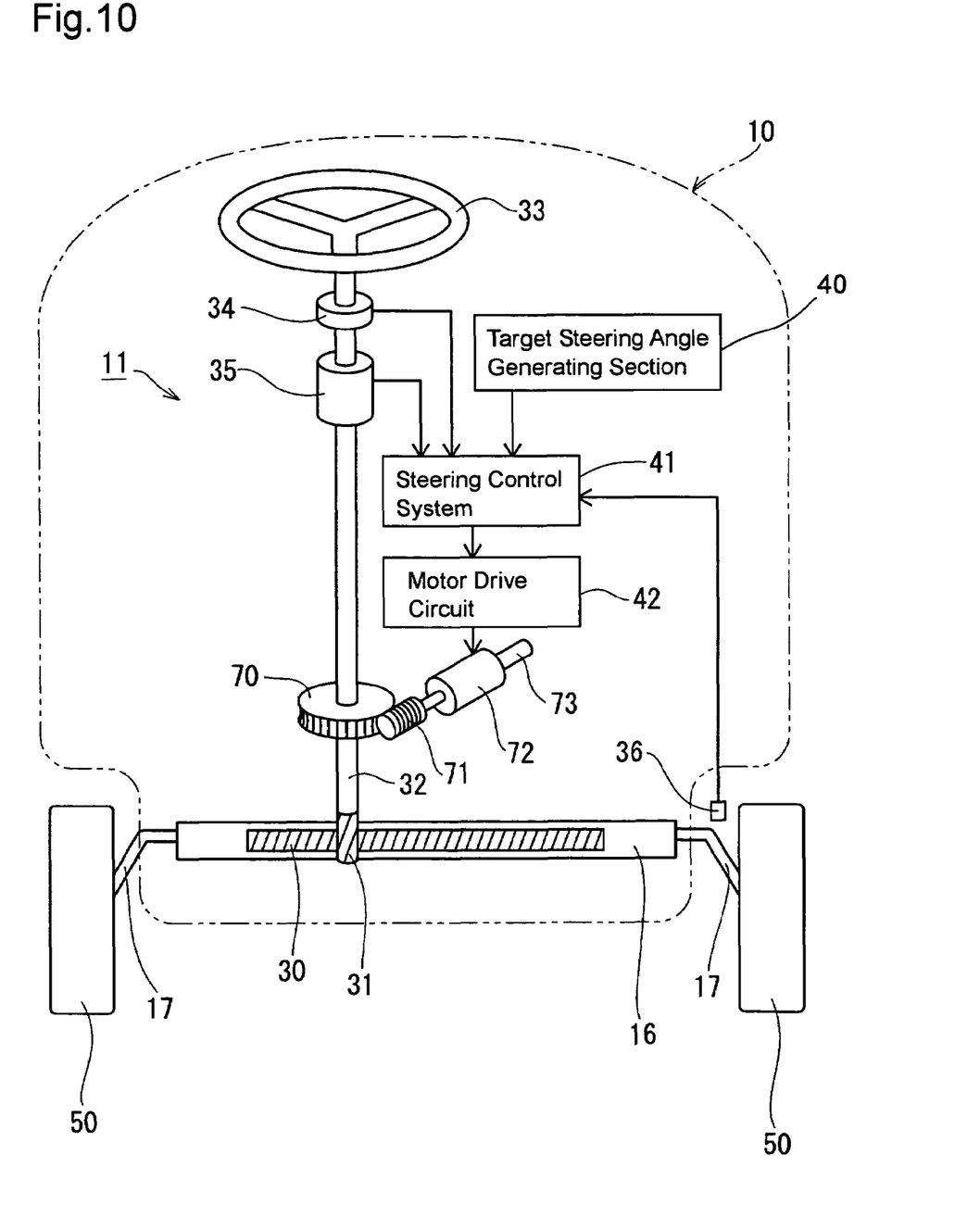
FIG. 10 is a schematic view showing the general structure of the vehicle with another steering control apparatus.

(1) Although the steering control apparatus 11 in the abovementioned embodiments is so constituted that the electric motor 19 is connected to the rack shaft 16 extends between the steered wheels 50, as shown in FIG. 10, it may be so constituted that a worm wheel 70 is fixedly mounted on the middle portion of the steering shaft 32 to make meshing engagement with a worm gear 71 that is secured to an output shaft of an electric motor 72.

(2) In the first and second embodiments, it may be so constituted that the steering control system 41 outputs an informing signal for informing the changeover from the automatic steering mode to the manual steering mode, so that the driver can know that the automatic steering mode is cancelled without driver's operation to know it.

Obviously, numerous modifications and variations of the present invention are possible in light of the above teachings. It is therefore to be understood that within the scope of the appended claims, the present invention may be practiced otherwise than as specifically described herein.

What is claimed is:

1. A steering control apparatus which is capable of running an automotive vehicle under an automatic steering control without driver's manual operation of a steering wheel, wherein a steering angle of steered wheels is controlled by an electric motor that is connected to the steering wheel and the steered wheels a reduction mechanism, and which is provided with a steering control system that calculates an electric current command value for the electric motor based on a deviation of a detected steering angle of the steered wheels from a target steering angle calculated according to a predetermined target position to which the vehicle is to run, wherein the steering control system comprises:

a detected steering angle calculating section which reads out a steering wheel rotational angle from a steering wheel rotational angle sensor provided on the rotational axis of the steering wheel and an motor rotational angle from a motor rotational angle sensor, storing the steering wheel rotational angle at the beginning of the vehicle running under the automatic steering control as an initial value $\theta c1$ of the detected steering angle, calculating a variation $\theta f$ of the motor rotational angle $\theta 7$ from the motor rotational angle at the beginning of the vehicle running under the automatic steering control, calculating the detected steering angle $\theta j$ by an equation of $\theta j = \theta c1 + \theta f/R$, wherein the initial value $\theta c1$ is added to a value obtained by dividing the variation $\theta f$ by a reduction ratio R of the reduction mechanism.

2. The steering control apparatus as set forth in claim 1, wherein the steering control system further comprising: a determining section for determining to suspend the vehicle running under the automatic steering control when a difference between the detected steering angle calculated by the detected steering angle calculating section and the steering wheel rotational angle detected by the steering wheel rotational angle sensor is over the predetermined allowable error.

3. The steering control apparatus as set forth in claim 2, wherein the steering control system further comprising: a time-integrated value calculating section for varying an electric current command value for the electric motor according to the time-integrated value calculated by integrating the deviation with respect to time, and a time-integrated value reset section for resetting a last time-integrated value before a vehicle running under the automatic steering control is resumed after a last vehicle running under the automatic steering control is suspended.

4. The steering control apparatus as set forth in claim 2, wherein the determining section causes the steering control system to output an informing signal for informing that the vehicle running under the automatic steering control is suspended.

* * * * *